United States Patent
Kaneko et al.

(10) Patent No.: US 10,263,259 B2
(45) Date of Patent: Apr. 16, 2019

(54) METHOD FOR PRODUCING CORE-SHELL CATALYST PARTICLES

(71) Applicant: TOYOTA JIDOSHA KABUSHIKI KAISHA, Toyota-shi, Aichi-ken (JP)

(72) Inventors: Keiichi Kaneko, Mishima (JP); Hiroko Kimura, Susono (JP); Makoto Adachi, Numazu (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 46 days.

(21) Appl. No.: 15/117,314

(22) PCT Filed: Dec. 22, 2014

(86) PCT No.: PCT/JP2014/083894
§ 371 (c)(1),
(2) Date: Aug. 8, 2016

(87) PCT Pub. No.: WO2015/122104
PCT Pub. Date: Aug. 20, 2015

(65) Prior Publication Data
US 2016/0359173 A1   Dec. 8, 2016

(30) Foreign Application Priority Data
Feb. 14, 2014   (JP) .................................. 2014-026748

(51) Int. Cl.
*H01M 4/92*   (2006.01)
*C23C 18/54*   (2006.01)
(Continued)

(52) U.S. Cl.
CPC ............. *H01M 4/925* (2013.01); *B22F 1/025* (2013.01); *C23C 18/168* (2013.01);
(Continued)

(58) Field of Classification Search
CPC ............................ H01M 4/925; H01M 4/8853
See application file for complete search history.

(56) References Cited

U.S. PATENT DOCUMENTS

2013/0022899 A1*   1/2013   Arai ........................ C23C 18/31
                                                                429/524
2013/0324394 A1*   12/2013   Shao ........................ B01J 37/06
                                                                502/339
(Continued)

FOREIGN PATENT DOCUMENTS

JP   2011-218278 A   11/2011
WO   2012-105107 A1   8/2012
(Continued)

OTHER PUBLICATIONS

Takashi Ohkawa, et al., "ORR activity and durability of Pd core/Pt shell structured catalyst", The 53rd Battery Symposium in Japan, Nov. 14-16, 2012, Fukuoka Japan, 3 pages.

*Primary Examiner* — Bryan D. Ripa
(74) *Attorney, Agent, or Firm* — Hunton Andrews Kurth LLP (57) ABSTRACT

The present invention is to provide a method for producing core-shell catalyst particles with high catalytic activity per unit mass of platinum. Disclosed is a method for producing core-shell catalyst particles including a core containing palladium and a shell containing platinum and covering the shell, wherein the method includes: a step of depositing copper on the surface of the palladium-containing particles by applying a potential that is nobler than the oxidation-reduction potential of copper to the palladium-containing particles in a copper ion-containing electrolyte, and a step of forming the shell by, after the copper deposition step and inside the reaction system kept at −3° C. or more and 10° C. or less, substituting the copper deposited on the surface of the palladium-containing particles with platinum by bring- (Continued)

ing the copper into contact with a platinum ion-containing solution in which platinum ions and a reaction inhibitor that inhibits a substitution reaction between the copper and the platinum, are contained.

8 Claims, 1 Drawing Sheet

(51) Int. Cl.
| | |
|---|---|
| *C25D 7/00* | (2006.01) |
| *C23C 18/42* | (2006.01) |
| *H01M 4/86* | (2006.01) |
| *C23C 18/16* | (2006.01) |
| *C23C 18/18* | (2006.01) |
| *C23C 28/02* | (2006.01) |
| *C25D 3/38* | (2006.01) |
| *C25D 5/48* | (2006.01) |
| *H01M 4/88* | (2006.01) |
| *B22F 1/02* | (2006.01) |
| *C25D 5/34* | (2006.01) |

(52) U.S. Cl.
CPC ...... *C23C 18/1635* (2013.01); *C23C 18/1637* (2013.01); *C23C 18/1648* (2013.01); *C23C 18/1689* (2013.01); *C23C 18/1848* (2013.01); *C23C 18/42* (2013.01); *C23C 18/54* (2013.01); *C23C 28/023* (2013.01); *C25D 3/38* (2013.01); *C25D 5/48* (2013.01); *C25D 7/00* (2013.01); *C25D 7/006* (2013.01); *H01M 4/8657* (2013.01); *H01M 4/8825* (2013.01); *H01M 4/8853* (2013.01); *H01M 4/8878* (2013.01); *H01M 4/921* (2013.01); *C25D 5/34* (2013.01); *H01M 4/8832* (2013.01)

(56) References Cited

U.S. PATENT DOCUMENTS

| | | | | |
|---|---|---|---|---|
| 2013/0344421 | A1* | 12/2013 | Montaut | H01M 4/926 429/524 |
| 2014/0178575 | A1* | 6/2014 | Iio | H01M 4/92 427/115 |
| 2015/0318560 | A1* | 11/2015 | Kaneko | H01M 4/8657 502/5 |

FOREIGN PATENT DOCUMENTS

| | | |
|---|---|---|
| WO | 2012/115624 A1 | 8/2012 |
| WO | WO 2012115624 A1 * | 8/2012 .............. B01J 37/06 |

* cited by examiner

METHOD FOR PRODUCING CORE-SHELL CATALYST PARTICLES

CROSS-REFERENCE TO RELATED APPLICATIONS

This is a national phase application based on the PCT International Patent Application No. PCT/JP2014/083894 filed Dec. 22, 2014, claiming priority to Japanese Patent Application No. 2014-026748 filed Feb. 14, 2014, the entire contents of both of which are incorporated herein by reference.

TECHNICAL FIELD

The present invention relates to a method for producing core-shell catalyst particles.

BACKGROUND ART

In fuel cells, a fuel and an oxidant are supplied to two electrically-connected electrodes to electrochemically oxidize the fuel, thereby converting chemical energy directly to electrical energy. Accordingly, fuel cells are not limited by the Carnot cycle and show high energy conversion efficiency. A fuel cell is generally composed of a stack of fuel cells, each of which has an electrolyte membrane that is sandwiched by a pair of electrodes, i.e., a membrane electrode assembly, as the basic structure.

Platinum and platinum alloy materials have been used as electrode catalysts of the fuel electrode (anode electrode) and oxidant electrode (cathode electrode) of a fuel cell. However, platinum in an amount that is required of electrode catalysts using the latest technology, is still too expensive to make the commercial mass production of fuel cells possible. Accordingly, there has been considerable research on the reduction of the amount of platinum contained in the fuel and oxidant electrodes of a fuel cell by combining platinum with a less expensive metal.

In recent years, as a fuel cell electrode catalyst, core-shell catalyst particles have attracted attention. For example, in Patent Document 1, a method for producing carbon-supported core-shell catalyst particles including a core and a shell covering the core, is disclosed, the method including a step of preparing fine core particles supported on a carbon support, an inactivation step of inactivating functional groups present on the surface of the carbon support by mixing the fine core particles with an inactivator, and a step of covering each fine core particle (core) with the shell after the inactivation step.

CITATION LIST

Patent Document 1: Japanese Patent Application Laid-Open No. 2011-218278

SUMMARY OF INVENTION

Technical Problem

However, core-shell catalyst particles obtained by conventional production methods have a problem of low catalytic activity per unit mass of platinum (hereinafter may be referred to as platinum mass activity).

The present invention was achieved in light of the above circumstance. An object of the present invention is to provide a method for producing core-shell catalyst particles, which is configured to produce core-shell catalyst particles with high platinum mass activity.

Solution to Problem

The method for producing core-shell catalyst particles according to the present invention is a method for producing core-shell catalyst particles including a core containing palladium and a shell containing platinum and covering the shell, wherein the method includes:

a step of depositing copper on the surface of the palladium-containing particles by applying a potential that is nobler than the oxidation-reduction potential of copper to the palladium-containing particles in a copper ion-containing electrolyte, and a step of forming the shell by, after the copper deposition step and inside the reaction system kept at −3° C. or more and 10° C. or less, substituting the copper deposited on the surface of the palladium-containing particles with platinum by bringing the copper into contact with a platinum ion-containing solution in which platinum ions and a reaction inhibitor that inhibits a substitution reaction between the copper and the platinum, are contained.

In the method for producing the core-shell particles according to the present invention, the reaction inhibitor is preferably at least one selected from the group consisting of citric acid, ethylenediaminetetraacetic acid (EDTA), sodium salts thereof, and potassium salts thereof.

In the method for producing the core-shell particles according to the present invention, the method preferably includes a step of bringing an acid solution into contact with the palladium-containing particles subjected to the substitution of the copper with the platinum, after the substitution step.

In the method for producing the core-shell particles according to the present invention, the acid solution preferably contains at least one selected from the group consisting of sulfuric acid, perchloric acid, nitric acid, hydrochloric acid and hypochlorous acid.

In the method for producing the core-shell particles according to the present invention, the palladium-containing particles are preferably supported on a support.

Advantageous Effects of Invention

According to the present invention, the method for producing the core-shell catalyst particles with high catalytic activity per unit mass of platinum, can be provided.

DESCRIPTION OF EMBODIMENTS

The method for producing core-shell catalyst particles according to the present invention is a method for producing core-shell catalyst particles including a core containing palladium and a shell containing platinum and covering the shell, wherein the method includes: a step of depositing copper on the surface of the palladium-containing particles by applying a potential that is nobler than the oxidation-reduction potential of copper to the palladium-containing particles in a copper ion-containing electrolyte, and a step of forming the shell by, after the copper deposition step and inside the reaction system kept at −3° C. or more and 10° C. or less, substituting the copper deposited on the surface of the palladium-containing particles with platinum by bringing the copper into contact with a platinum ion-containing solution in which platinum ions and a reaction inhibitor that inhibits a substitution reaction between the copper and the platinum, are contained.

As the method for producing core-shell catalyst particles in which a core containing palladium (hereinafter may be referred to as palladium-containing core) is covered with a shell containing platinum (hereinafter may be referred to as platinum-containing shell), a displacement plating method that uses Cu-UPD has been known. Cu-UPD is a method for depositing copper on the surface of palladium-containing particles by applying a potential that is nobler than the oxidation-reduction potential of copper to the palladium-containing particles in a copper ion-containing electrolyte. The core-shell catalyst particles in which the palladium-containing core is covered with the platinum-containing shell, can be produced by immersing palladium-containing particles having copper deposited thereon in a solution containing platinum ions and substituting the copper with platinum using a difference in ionization tendency.

In the displacement plating method that uses Cu-UPD, as a technique to increase the platinum mass activity of the core-shell catalyst particles by inhibiting reactions (such as a substitution reaction of copper with platinum and a reaction of further platinum deposition on the surface of platinum substituted for copper) and uniformly forming a platinum-containing shell on the palladium-containing particle surface, the following techniques are known: (a) a technique to decrease the diffusion rate of platinum ions by, at the time of substituting the copper deposited on the palladium-containing particle surface with platinum, adding citric acid (a complex forming agent) as reaction inhibitor to a platinum ion-containing solution and forming a complex of the citric acid and platinum, and (b) a technique to decrease the substitution reaction rate of copper with platinum by, at the time of substituting the copper deposited on the palladium-containing particle surface with platinum, keeping the temperature inside a platinum substitution reaction system at a low temperature.

However, the core-shell catalyst particles obtained by the use of any one of the techniques (a) and (b) do not have sufficient platinum mass activity (see Comparative Examples 2 and 3).

Meanwhile, as described above, the techniques (a) and (b) have an effect of reducing the substitution reaction of copper with platinum, and it is considered that there is almost no effect of increasing the platinum mass activity of the core-shell catalyst particles, which is an effect that is obtained by the combination of the techniques (a) and (b).

The inventors of the present invention have found that by combining the techniques (a) and (b), the platinum mass activity of the core-shell catalyst particles is increased higher than an additive effect. Based on this finding, they achieved the present invention. The reason why the platinum mass activity of the core-shell catalyst particles is increased higher than the additive effect by combining the techniques (a) and (b), is presumed as follows: the platinum ion diffusion rate is decreased by the addition of the reaction inhibitor, and the substitution reaction rate of copper with platinum is decreased by decreasing the temperature inside the reaction system; therefore, shell defective sites at which part of the core surface of the core-shell catalyst particles is exposed could be reduced more than ever; further platinum deposition on the surface of platinum substituted for copper could be inhibited; and the shell could be uniformly formed on the core-shell catalyst particle surface.

Also, a technique to carry out an acid treatment as a post-treatment for mending the shell defective sites at which part of the core surface of the core-shell catalyst particles is exposed, is known. The inventors of the present invention have found that by carrying out the acid treatment on the core-shell catalyst particles obtained by the present invention, the platinum mass activity of the core-shell catalyst particles is increased higher than expected, compared to the case of carrying out the acid treatment on the core-shell catalyst particles produced by the use of any one of the techniques (a) and (b) or without the use of the techniques. The reason for this is presumed to be because the shell defective sites are decreased more than conventional core-shell catalyst particles by the acid treatment.

Figure 1:
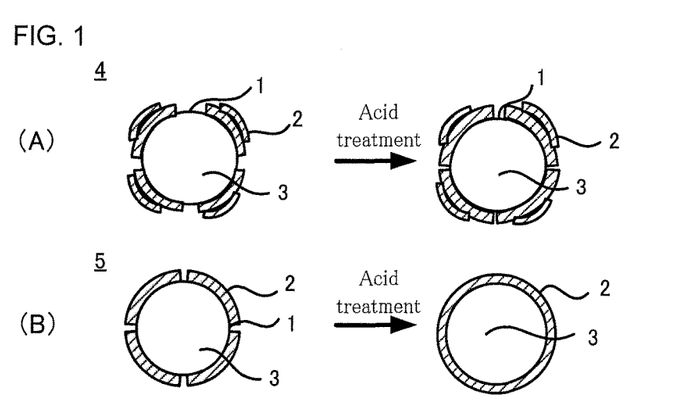
FIG. 1 includes a schematic view (FIG. 1(A)) of a process of mending, by an acid treatment, shell defective sites on the surface of a core-shell catalyst particle produced by a conventional production method, and a schematic view (FIG. 1(B)) of a process of mending, by an acid treatment, shell defective sites on the surface of a core-shell catalyst particle produced by the production method of the present invention.

That is, as shown in FIG. 1(A), a core-shell catalyst particle 4 produced by a conventional production method is such that a platinum-containing shell 2 is further deposited on a platinum-containing shell 2 formed on the surface of a palladium-containing core 3 (platinum is further deposited on the surface of platinum substituted for copper) and a shell defective site 1 at which the palladium-containing core 3 is exposed, is large. Therefore, by carrying out the acid treatment, the shell defective site 1 is partly filled, and the platinum mass activity is increased to a certain degree. However, platinum still remains on the surface of the platinum substituted for the copper, and the shell defective site 1 still exists. Therefore, it is presumed that sufficient platinum mass activity was not obtained. Meanwhile, as shown in FIG. 1(B), a core-shell catalyst particle 5 produced by the production method of the present invention is such that a single-layered platinum-containing shell 2 is formed on the surface of a palladium-containing core 3 (there is no further platinum deposition on the surface of platinum substituted for copper) and the shell defective site 1 at which the palladium-containing core 3 is exposed, is smaller than the conventional core-shell catalyst particle 4. Therefore, it is presumed that by carrying out the acid treatment, the shell defective site 1 was almost filled, and sufficient platinum mass activity was obtained.

In the present invention, the palladium-containing core contains palladium and/or a palladium alloy.

As the palladium alloy, there may be mentioned an alloy of palladium and a metal material selected from the group consisting of iridium, ruthenium, rhodium, iron, cobalt, nickel, copper, silver and gold. The palladium alloy-constituting metal (other than palladium) can be one or more kinds of metals.

In the palladium alloy, the palladium content preferably accounts for 80% by mass or more of the total mass (100% by mass) of the alloy. This is because a platinum-containing uniform shell can be formed when the palladium content is 80% by mass or more.

In the present invention, the platinum-containing shell contains platinum and/or a platinum alloy.

As the platinum alloy, there may be mentioned an alloy of platinum and a metal material selected from the group consisting of iridium, ruthenium, rhodium, nickel and gold. The platinum alloy-constituting metal (other than platinum) can be one or more kinds of metals.

In the platinum alloy, the platinum content preferably accounts for 90% by mass or more of the total mass (100% by mass) of the alloy. This is because sufficient catalytic activity and durability are not obtained when the platinum content is less than 90% by mass.

In the present invention, that the shell covers the core encompasses not only a configuration in which the whole surface of the core is covered with the shell, but also a configuration in which the core surface is partly covered with the shell and is partly exposed. In addition, the shell can be either a monoatomic layer or atomic layers composed of two or more stacked atoms. From the viewpoint of increasing the platinum mass activity, the shell is preferably a monoatomic layer.

Figure 2:
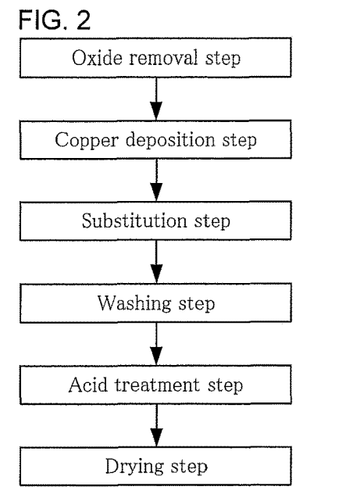
FIG. 2 is a flow chart of an example of the method for producing core-shell catalyst particles according to the present invention.

FIG. 2 is a flow chart of an example of the method for producing the core-shell catalyst particles of the present invention.

The production method shown in FIG. 2 has (1) an oxide removal step, (2) a copper deposition step, (3) a substitution step, (4) a washing step, (5) an acid treatment step and (6) a drying step.

The production method of the present invention has (2) the copper deposition step and (3) the substitution step. As needed, the production method includes (1) the oxide removal step before the copper deposition step, and it includes (4) the washing step, (5) the acid treatment step, (6) the drying step, etc., after the substitution step.

Hereinafter, these steps will be described in order.

(1) Oxide Removal Step

The oxide removal step is a step of removing palladium oxides (impurities) from the surface of the palladium-containing particles, before the copper deposition step. By the oxide removal step, the palladium-containing particles can be uniformly covered with the platinum-containing shell.

For example, the oxide removal can be carried out by applying a predetermined potential to the palladium-containing particles in an electrolyte containing the palladium-containing particles.

To apply the potential to the palladium-containing particles, there may be used the same method and potential control device as those of the below-described copper deposition step.

The electrolyte which can be used in the oxide removal step is not particularly limited, as long as it is a solution in which palladium oxides can be eluted by an appropriate potential sweep.

Concrete examples of the electrolyte include an acid solution. Concrete examples of the acid which can be used in the oxide removal step include the same acids as those which can be used for a copper ion-containing electrolyte to be described below.

In the case where the oxide removal step and the below-described copper deposition step are carried out in the same reaction container, the copper ion-containing electrolyte can be added to the electrolyte used in the oxide removal step. For example, in the case where sulfuric acid is used as the electrolyte of the oxide removal step, a copper sulfate aqueous solution can be added to the used sulfuric acid and used in the copper deposition step. Counter anions in the electrolyte used in the oxide removal step and counter anions in the copper ion-containing electrolyte used in the copper deposition step can be the same kind or different kinds of counter anions.

It is preferable to bubble nitrogen into the electrolyte, from the viewpoint of removing oxygen in the electrolyte as much as possible and allowing quick oxide removal.

From the viewpoint of quick oxide removal, it is preferable to sweep the potential back and forth several times in a predetermined potential range. Examples of the signal pattern of the applied potential include a square wave, a triangle wave and a trapezoidal wave.

The potential range is not particularly limited and is preferably 0.05 to 1.2 V (vs. RHE).

In the case where the signal pattern of the applied potential is a square wave, the number of potential cycles is not particularly limited. Holding 0.05 V (vs. RHE) for 15 to 60 seconds and then holding 1.2 V (vs. RHE) for 15 to 60 seconds are considered as one cycle, and it is preferable to carry out 1,000 to 2,500 cycles.

In the case where the signal pattern of the applied potential is a triangle wave, the number of the potential cycles is not particularly limited and is preferably 800 to 3,000 cycles. The potential sweep rate can be 5 to 100 mV/sec, for example.

In the oxide removal step, the temperature inside the reaction system is not particularly limited. In the case where the oxide removal step, the copper deposition step and the substitution step are carried out in the same reaction container, from the viewpoint of quickly adjusting the temperature inside the reaction system in the substitution step to −3° C. or more and 10° C. or less, it is preferable to keep the temperature at −3° C. or more and 10° C. or less.

(2) Copper Deposition Step

The copper deposition step is a step of depositing copper on the surface of the palladium-containing particles by applying a potential that is nobler than the oxidation-reduction potential of copper to the palladium-containing particles in a copper ion-containing electrolyte.

As the palladium-containing particles, at least one selected from palladium particles and palladium alloy particles can be used.

The average particle diameter of the palladium-containing particles is not particularly limited and is preferably 7 nm or less. If the average particle diameter of the palladium-containing particles is more than 7 nm, the surface area per mass of the platinum decreases; therefore, a large amount of platinum is required to obtain desired activity and is very expensive. If the average particle diameter of the palladium-containing particles is too small, the palladium itself is likely to dissolve and decreases the durability of the catalyst. Therefore, the average particle diameter of the palladium-containing particles is preferably 3 nm or more, particularly preferably 4 nm or more.

Preferably, the palladium-containing particles are supported on a support. The support is not particularly limited. An electroconductive support is preferably used as the support, from the point of view that in the case of using the core-shell catalyst particles of the present invention for the electrocatalyst layer of a fuel cell, electroconductivity is provided to the electrocatalyst layer.

Concrete examples of materials that can be used as the support for supporting the palladium-containing particles include: electroconductive carbonaceous materials including carbon particles and carbon fibers, such as: Ketjen Black (product name; manufactured by: Ketjen Black International Company), Vulcan (product name; manufactured by: Cabot), Norit (product name; manufactured by: Norit), Black Pearls (product name; manufactured by: Cabot), Acetylene Black (product name; manufactured by: Chevron); metal materials including metal particles and metal fibers; and non-electroconductive materials including organic pigments, such as perylene red.

The copper ion-containing electrolyte is not particularly limited, as long as it is an electrolyte in which copper can be deposited on the surface of the palladium-containing particles by Cu-UPD. The copper ion-containing electrolyte is generally composed of a solvent in which a predetermined amount of copper salt is dissolved. However, the electrolyte is not limited to this constitution and is required to be an electrolyte in which a part or all of the copper ions are separately present.

As the solvent used for the copper ion-containing electrolyte, there may be mentioned water and organic solvents. Water is preferred from the point of view that it does not prevent the deposition of copper on the surface of the palladium-containing particles.

Concrete examples of the copper salt used for the copper ion-containing electrolyte include copper sulfate, copper nitrate, copper chloride, copper chlorite, copper perchlorate and copper oxalate.

The copper ion concentration of the electrolyte is not particularly limited and is preferably 10 to 1,000 mM.

In addition to the solvent and the copper salt, the copper ion-containing electrolyte can contain an acid, for example. Concrete examples of acids that can be added to the copper ion-containing electrolyte include sulfuric acid, nitric acid, hydrochloric acid, chlorous acid, perchloric acid and oxalic acid. Counter anions in the copper ion-containing electrolyte and counter anions in the acid can be the same kind or different kinds of counter anions.

It is also preferable to bubble an inert gas into the electrolyte in advance. This is because the palladium-containing particles can be inhibited from oxidation and can be uniformly covered with the platinum-containing shell. As the inert gas, there may be used nitrogen gas, argon gas, etc.

The palladium-containing particles can be immersed and dispersed in the electrolyte by adding the particles in a powdery state to the electrolyte, or the palladium-containing particles can be immersed and dispersed in the electrolyte by dispersing the particles in a solvent to prepare a palladium-containing particle dispersion and then adding the dispersion to the electrolyte. As the solvent used for the palladium-containing particle dispersion, there may be used the same solvent as that used for the above-described copper ion-containing electrolyte. Also, the palladium-containing particle dispersion can contain the acid that can be added to the above-described copper ion-containing electrolyte.

Also, the palladium-containing particles can be immersed in the electrolyte by fixing the particles on an electroconductive substrate or working electrode and then immersing a surface having the palladium-containing particles fixed thereon of the electroconductive substrate or working electrode in the electrolyte. To fix the palladium-containing particles, for example, there may be mentioned the following method: a paste containing the palladium-containing particles is prepared using an electrolyte resin (such as Nafion (trade name)) and a solvent (such as water or alcohol) and applied to a surface of the electroconductive substrate or working electrode, thereby fixing the palladium-containing particles.

The method for applying a potential to the palladium-containing particles is not particularly limited, and it can be a general method. For example, there may be mentioned a method for immersing a working electrode, a counter electrode and a reference electrode in the copper ion-containing electrolyte and then applying a potential to the working electrode.

As the working electrode, for example, there may be used materials that can ensure electroconductivity, such as metal materials including titanium, a platinum mesh, a platinum plate and a gold plate, and electroconductive carbonaceous materials including glassy carbon and a carbon plate. Also, the reaction container can be formed with any of the electroconductive materials and used as the working electrode. In the case of using the reaction container made of any of the metal materials as the working electrode, it is preferable that the inner wall of the reaction container is coated with $RuO_2$, from the viewpoint of preventing corrosion. In the case of using the reaction container made of any of the carbonaceous materials as the working electrode, the container can be used as it is without any coating.

As the counter electrode, for example, there may be used a platinum black-plated platinum mesh and electroconductive carbon fibers.

As the reference electrode, for example, there may be used a reversible hydrogen electrode (RHE), a silver-silver chloride electrode and a silver-silver chloride-potassium chloride electrode.

As the potential control device, for example, there may be used a potentiostat and a potentio-galvanostat.

The applied potential is not particularly limited, as long as it is a potential that can deposit copper on the surface of the palladium-containing particles, that is, a nobler potential than the oxidation-reduction potential of copper. For example, the applied potential is preferably in a range of 0.35 to 0.7 V (vs. RHE), particularly preferably 0.4 V (vs. RHE).

The potential applying time is not particularly limited. It is preferable to apply the potential for 60 minutes or more, and it is more preferable to apply the potential until reaction current becomes steady and close to zero.

The potential can be applied by a potential sweep in a range that includes the above potential range. More specifically, the potential sweep range is preferably 0.3 to 0.8 V (vs. RHE).

The number of the potential sweep cycles is not particularly limited and is preferably 1 to 10,000 cycles. The potential sweep rate is 0.01 to 100 mV/sec, for example.

From the viewpoint of preventing the oxidation of the surface of the palladium-containing particles and preventing the oxidation of the copper, it is preferable to carry out the copper deposition step under an inert gas atmosphere such as nitrogen atmosphere.

Also in the copper deposition step, it is preferable to appropriately stir the copper ion-containing electrolyte, as needed. For example, in the case where the reaction container that functions as the working electrode is used and the palladium-containing particles are immersed and dispersed in the electrolyte in the reaction container, the palladium-containing particles can be brought into contact with the surface of the reaction container (working electrode) by stirring the electrolyte, and thus a uniform potential can be applied to the palladium-containing particles. In this case, the stirring can be carried out continuously or intermittently in the copper deposition step.

In the copper deposition step, the temperature inside the reaction system is not particularly limited. In the case where the copper deposition step and the below-described substitution step are carried out in the same reaction container, from the viewpoint of quickly adjusting the temperature inside the reaction system in the substitution step to −3° C. or more and 10° C. or less, it is preferable to keep the temperature at −3° C. or more and 10° C. or less.

(3) Substitution Step

The substitution step is a step of forming the shell by, after the copper deposition step and inside the reaction system kept at −3° C. or more and 10° C. or less, substituting the copper deposited on the surface of the palladium-containing particles with platinum by bringing the copper into contact with a platinum ion-containing solution in which platinum ions and a reaction inhibitor that inhibits a substitution reaction between the copper and the platinum, are contained.

In the present invention, "inside the reaction system" is a concept that encompasses regions used for reactions (such as reaction container and device) and gasses, liquids and solids stored in the regions.

In the substitution step, the temperature inside the reaction system is required to be kept at −3° C. or more and 10° C. or less. From the viewpoint of forming a uniform shell on the surface of the palladium-containing particles, the temperature is preferably kept at 3° C. or more and 9° C. or less, particularly preferably 5° C. or more and 8° C. or less. In the case where the temperature is less than −3° C., the solution is frozen and no reaction may proceed. In the case where the temperature is more than 10° C., sufficient platinum mass activity may not be obtained.

The method for keeping the temperature inside the reaction system is not particularly limited. For example, there may be mentioned a method that uses a circulation cooling device (chiller) or a cooling tube.

The platinum ion-containing solution is not particularly limited, as long as it contains at least platinum ions and a reaction inhibitor.

The reaction inhibitor is not particularly limited, as long as it can inhibit a substitution reaction between the copper and the platinum. Examples of the reaction inhibitor include a complex forming agent that forms a complex with the platinum, the copper deposited on the palladium-containing particle surface, and the palladium exposed on the palladium-containing particle surface, in the solution.

Examples of the complex forming agent include citric acid, sodium salt of citric acid, potassium salt of citric acid, ethylenediaminetetraacetic acid (hereinafter may be referred to as EDTA), sodium salt of EDTA, and potassium salt of EDTA. Preferred is citric acid. These complex forming agents can be used alone or in combination of two or more. In the solution, these complex forming agents form a complex with the platinum and the copper; therefore, the substitution reaction between the copper and the platinum is inhibited and, as a result, the surface of the palladium-containing particles can be uniformly covered with the platinum-containing shell.

The concentration of the reaction inhibitor in the platinum ion-containing solution is not particularly limited and is preferably 1 to 10 times higher than the platinum ion concentration.

A platinum salt is used for the platinum ion-containing solution. Examples of the platinum salt include $K_2PtCl_4$ and $K_2PtCl_6$. Also, an ammonia complex such as ($[PtCl_4][Pt(NH_3)_4]$) can be used.

The platinum ion concentration of the platinum ion-containing solution is not particularly limited and is preferably 0.01 to 100 mM.

A solvent is used for the platinum ion-containing solution. The solvent can be the same as the solvent used for the above-described copper ion-containing electrolyte.

In addition to the solvent, the reaction inhibitor and the platinum salt, the platinum ion-containing solution can also contain an acid, etc. The acid can be the same as the acid used for the above-described copper ion-containing electrolyte.

From the viewpoint of keeping the temperature inside the reaction system at −3° C. or more and 10° C. or less, it is preferable to adjust the temperature of the platinum ion-containing solution to −3° C. or more and 10° C. or less in advance. Also, the platinum ion-containing solution is sufficiently stirred, and from the viewpoint of preventing the oxidation of the surface of the palladium-containing particles or preventing the oxidation of the copper, it is preferable to bubble nitrogen into the solution in advance.

The substitution time (contact time between the platinum ion-containing solution and the palladium-containing particles) is not particularly limited and is preferably 10 minutes or more. Since the potential of the reaction solution is increased by adding the platinum ion-containing solution, it is more preferable to continue the substitution until the potential monitored shows no change.

The method for bringing the copper deposited on the surface of the palladium-containing particles into contact with the platinum ion-containing solution is not particularly limited. In the case where the copper deposition step and the substitution step are carried out in the same reaction container, the platinum ion-containing solution can be added to the electrolyte used in the copper deposition step. For example, it is allowed that after the copper deposition step, the potential control is stopped, and the platinum ion-containing solution is added to the copper ion-containing electrolyte used in the copper deposition step, thereby bringing the palladium-containing particles on which copper is deposited into contact with the platinum ion-containing solution.

(4) Washing Step

The washing step is a step of washing, with water, the palladium-containing particles subjected to the substitution of the copper with the platinum, after the substitution step. From the viewpoint of eluting the reaction inhibitor physically adsorbing to the support surface, the washing step is preferably carried out before the acid treatment step.

In the washing step, as the water, cold or warm water can be used. Or, cold water and warm water can be mixed together and used for washing. More specifically, the palladium-containing particles can be washed with cold water at less than 30° C. and then washed with warm water.

The temperature of the warm water is preferably 30° C. or more and 100° C. or less, from the viewpoint of eluting the reaction inhibitor physically adsorbing to the support surface.

The washing step is preferably a step of washing the palladium-containing particles by dispersing them in water, preferably in warm water. The method for dispersing the palladium-containing particles in water is not particularly limited. For example, there may be mentioned a dispersion method with ultrasonic waves, a method for pulverizing the particles with a ball mill and then adding them to water, and a method for dispersing the particles with a device that uses shear force, such as a nanomizer. Of them, the dispersion method with ultrasonic waves is preferably used, from the viewpoint of relatively less damage to the structure of the palladium-containing particles.

It is preferable to repeat the washing step until the conductivity of the water used for washing (hereinafter may be referred to washing water) reaches 10 µS/cm or less. This is because the amount of the reaction inhibitor physically adsorbing to the support surface is determined to be still large in the case where the conductivity of the washing water is high. In particular, the washing water refers to supernatant obtained by adding the palladium-containing particles to water in a container (10 g of the palladium-containing particles per liter of water) and dispersing them.

(5) Acid Treatment Step

The acid treatment step is a step of bringing an acid solution into contact with the palladium-containing particles subjected to the substitution of the copper with the platinum, after the substitution step. By the acid treatment, the palladium-containing particles exposed are selectively eluted, so that the palladium-containing particles become smaller. Therefore, the shell defective sites are covered with the shell, so that the platinum mass activity of the core-shell catalyst particles can be increased.

Examples of the acid solution include nitric acid, sulfuric acid, perchloric acid, hydrochloric acid and hypochlorous acid. From the viewpoint of having an oxidizing power that is sufficient to dissolve the palladium, nitric acid is preferred.

The concentration of the acid solution is as follows: for example, in the case of using nitric acid as the acid solution, the nitric acid concentration is preferably $1.0 \times 10^{-4}$ to 2 mol/L, more preferably $1.0 \times 10^{-3}$ to 1 mol/L, still more preferably $1.0 \times 10^{-2}$ to $1.0 \times 10^{-1}$ mol/L.

In the case of using sulfuric acid as the acid solution, the sulfuric acid concentration is preferably $1.0 \times 10^{-4}$ to 2 mol/L, more preferably $1.0 \times 10^{-3}$ to 1 mol/L, still more preferably $1.0 \times 10^{-2}$ to $1.0 \times 10^{-1}$ mol/L.

The temperature of the acid solution is preferably 40° C. or more, particularly preferably 50° C. or more, since the shell defective sites can be effectively and efficiently mended. Also, the temperature of the acid solution is preferably 90° C. or less, particularly preferably 80° C. or less, from the viewpoint of preventing the palladium-containing particles from aggregation, etc.

The time of contact of the palladium-containing particles with the acid solution can be appropriately adjusted, depending on the type, concentration, temperature, etc., of the acid solution. For example, it can be about 30 minutes to 2 hours.

The method for bringing the palladium-containing particles into contact with the acid solution is not particularly limited. From the viewpoint of allowing the acid reaction to sufficiently proceed, a method for immersing the palladium-containing particles in the acid solution is preferred. At the time of immersing the palladium-containing particles in the acid solution, it is preferable to stir the acid solution and disperse the particles with a ultrasonic homogenizer, a magnetic stirrer, a motor with stirring blades, etc.

(6) Drying Step

The drying step is a step of drying the thus-obtained core-shell catalyst particles after the substitution step.

The method for drying the core-shell catalyst particles is not particularly limited, as long as it is a method that can remove the solvent, etc. For example, there may be mentioned such a drying method that a temperature of 50 to 100° C. is kept for 6 to 12 hours under an inert gas atmosphere.

As needed, the core-shell catalyst particles can be pulverized. The pulverizing method is not particularly limited, as long as it is a method that can pulverize solids. Examples of the pulverization include pulverization using a mortar or the like under an inert atmosphere or in the atmosphere, and mechanical milling using a ball mill, turbo mill or the like.

EXAMPLES

Example 1

[Oxide Removal Step]

First, 1 g of palladium-supported carbon (Pd/C) in which palladium particles are supported on carbon particles, was put in a reaction container. Then, 1.0 L of a 0.05 M sulfuric acid aqueous solution was added thereto, and the Pd/C was suspended.

Next, a working electrode (glassy carbon), a counter electrode (platinum mesh) and a reference electrode (silver-silver chloride) were placed in the reaction container so that they were immersed in the sulfuric acid aqueous solution.

The reaction container was hermetically closed. The sulfuric acid aqueous solution in which the Pd/C was suspended, was subjected to nitrogen gas bubbling for 180 minutes, thereby removing oxygen from the aqueous solution.

Next, a potentiostat was connected to the working electrode, the counter electrode and the reference electrode, and 2,500 cycles of applying a potential in a square wave signal pattern (holding 0.05 V (vs. RHE) for 15 seconds and then holding 1.2 V (vs. RHE) for 15 seconds were considered as one cycle) were carried out on the working electrode, thereby removing impurities and oxides present on the palladium particle surface. The potential of the silver-silver chloride electrode is converted to RHE.

In the oxide removal step, the temperature inside the reaction system was kept at 5° C.

[Copper Deposition Step]

With bubbling nitrogen into the sulfuric acid aqueous solution in the reaction container, copper sulfate pentahydrate was added in the reaction container so as to reach a copper ion concentration of 0.05 mol/L. Then, the potential of the working electrode was fixed at 0.35 V (vs. RHE) to deposit copper on the palladium particles. The potential was kept applied until the reaction current became steady and close to zero.

In the copper deposition step, the temperature inside the reaction system was kept at 5° C.

[Substitution Step]

The potential control was stopped, and 440 mg of $K_2PtCl_4$ and 1.5 g of citric acid, which is a complex forming agent serving as a reaction inhibitor, were dissolved in 100 mL of the 0.05 M sulfuric acid aqueous solution subjected to the oxygen removal. A platinum ion-containing solution thus obtained was gradually added in the reaction container. After the addition was completed, the mixture was kept stirred until the self-potential inside the reaction container reaches a plateau (that is, until the self-potential shows no change), thereby substituting the copper on the palladium particle surface with the platinum.

In the substitution step, the temperature inside the reaction system was kept at 5° C., using a circulation cooling device (chiller).

[Washing Step]

After the substitution step, the solution in the reaction container was filtered, and a solid thus obtained was washed with 4L of pure water.

The solid washed with pure water was put in 1 L of pure water. The solid was sufficiently dispersed in the pure water with a ultrasonic homogenizer. Then, with stirring the dispersion, the temperature of the dispersion was increased to 60° C. Next, 40 mL of the supernatant of the dispersion was collected, filtered using a syringe with a filter, and then measured for conductivity under the following conditions:

Measurement device: Conductivity Meter AOL-40 (manufactured by DKK)

Measurement temperature: 25° C.

In the case where the conductivity of the supernatant was more than 10 μS/cm, the dispersion was filtered, and a solid thus obtained was put in 1 L of pure water again, and the warm water washing was repeated. On the other hand, in the case where the conductivity of the washing water was 10 μS/cm or less, the dispersion was filtered to obtain a catalyst cake.

A part of the thus-obtained catalyst cake was collected and dried at 60° C. for 8 hours or more under reduced pressure, thereby obtaining core-shell catalyst particles not subjected to an acid treatment.

[Acid Treatment Step]

After the warm water washing, the rest of the catalyst cake was collected, put in pure water and dispersed with a ultrasonic homogenizer. Then, nitric acid was added thereto, thereby preparing a 1 mol/L nitric acid dispersion. The nitric acid dispersion was prepared so that the solid content concentration of the dispersion reaches of 1 g/mL. The nitric acid dispersion was stirred for 30 minutes at 50° C. Then, the nitric acid dispersion was filtered, and a solid thus obtained was repeatedly washed with pure water until the filtrate becomes neutral.

[Drying Step]

A catalyst cake thus obtained was dried at 60° C. for 8 hours or more under reduced pressure, thereby obtaining core-shell catalyst particles subjected to the acid treatment.

Example 2

Core-shell catalyst particles were produced in the same manner as Example 1, except that in the substitution step, the temperature inside the reaction system was kept at 7° C.

Example 3

Core-shell catalyst particles were produced in the same manner as Example 1, except that in the substitution step, the temperature inside the reaction system was kept at 8° C.

Comparative Example 1

Core-shell catalyst particles were produced in the same manner as Example 1, except that in the substitution step, the temperature inside the reaction system was kept at 25° C., and the reaction inhibitor (citric acid) was not used in the substitution step.

Comparative Example 2

Core-shell catalyst particles were produced in the same manner as Example 1, except that in the substitution step, the temperature inside the reaction system was kept at 25° C.

Comparative Example 3

Core-shell catalyst particles were produced in the same manner as Example 1, except that the reaction inhibitor (citric acid) was not used in the substitution step.

[Mass Activity Evaluation]

The following processes were carried out on the core-shell catalyst particles (subjected and not subjected to the acid treatment) of Examples 1 to 3 and Comparative Examples 1 to 3. First, 30 mg of the core-shell catalyst particles was taken and added to a mixed solution of 130 μL of a 5% Nafion (trademark) dispersion ("DE521" manufactured by DuPont), 30 mL of pure water, and 7.5 mL of 2-propanol. The mixture was subjected to a dispersion treatment for 16 minutes with a homogenizer, thereby producing a catalyst ink. Next, 10 μL of the catalyst ink was applied onto the glassy carbon electrode of a rotating disk electrode (RDE) (manufactured by Hokuto Denko Corporation) and dried.

Then, oxygen reduction reaction (ORR) measurement was carried out on the core-shell catalyst particles.

The ORR measurement conditions are as follows.

Electrolyte: 0.1 M perchloric acid aqueous solution (saturated with oxygen in advance)

Atmosphere: Under oxygen atmosphere

Sweep rate: 10 mV/sec

Potential sweep range: 0.1 to 1.05 V (vs. RHE)

Rotational frequency of rotating disk electrode: 1,600 rpm

An oxygen reduction wave was obtained by the ORR measurement. From the oxygen reduction wave, the catalytic activity (MA) per unit mass of the platinum in the core-shell catalyst particles was measured.

The catalytic activity per unit mass of the platinum in the core-shell catalyst particles was measured as follows: for the oxygen reduction wave obtained by the ORR measurement, the current value at 0.9 V (vs. RHE) of the second cycle was considered as oxygen reduction current ($I_{0.9}$) and the current value at 0.4 V (vs. RHE) of the second cycle was considered as diffusion limited current (hum); an activation controlled current (Ik) was obtained by the following formula (1); and the Ik (A) was divided by the amount (g) of the platinum contained in the core-shell catalyst particles applied onto the glassy carbon electrode, thereby measuring the catalytic activity (A/g-Pt) per unit mass of the platinum.

$$Ik=(I_{lim} \times I_{0.9})/(I_{lim}-I_{0.9}) \quad \text{[Formula (1)]}$$

In the formula (1), the meanings of the symbols are as follows:

Ik: Activation controlled current (A)

$I_{lim}$: Diffusion limited current (A)

$I_{0.9}$: Oxygen reduction current (A)

Figure 3:
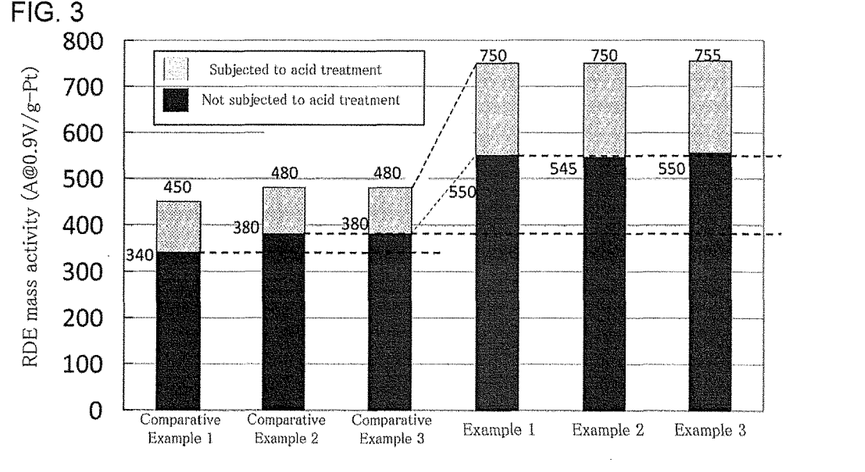
FIG. 3 is a view showing the platinum mass activities of the core-shell catalyst particles (subjected to an acid treatment and not subjected to an acid treatment) of Examples 1 to 3 and Comparative Examples 1 to 3.

Measurement results of the catalytic activity (MA) per unit mass of the platinum are shown in FIG. 3.

[Effects Caused by the Combination of Reaction Inhibitor Adding Treatment and Low Temperature Keeping Treatment, in the Absence of Acid Treatment]

First, the platinum mass activities of the core-shell catalyst particles (not subjected to the acid treatment) of Examples 1 to 3 and Comparative Examples 1 to 3 were compared to discuss the difference in the platinum mass activity increasing effect between the case where no treatment was carried out (Comparative Example 1) and the case where the reaction inhibitor adding treatment and keeping the temperature inside the reaction system at low temperature (hereinafter may be referred to as low temperature keeping treatment) were carried out in combination (Examples 1 to 3), where only the reaction inhibitor adding treatment was carried out (Comparative Example 2), and where only the low temperature keeping treatment was carried out (Comparative Example 3).

As shown in FIG. 3, the platinum mass activities of the core-shell catalyst particles not subjected to the acid treatment are as follows: 550 A/g-Pt in Example 1, 545 A/g-Pt in Example 2, 550 A/g-Pt in Example 3, 340 A/g-Pt in Comparative Example 1, 380 A/g-Pt in Comparative Example 2, and 380 A/g-Pt in Comparative Example 3.

From these results, it is clear that for the core-shell catalyst particles not subjected to the acid treatment, the increase in the platinum mass activity from Comparative Example 1 to Comparative Example 2 and to Comparative Example 3 are both 40 (=380−340) A/g-Pt; meanwhile, the increase in the platinum mass activity from Comparative Example 1 to Example 1, to Example 2 and to Example 3 are as follows: 210 (=550−340) A/g-Pt in Examples 1 and 3, and 205 (=545−340) A/g-Pt in Example 2.

Therefore, it is clear that the increase in the platinum mass activity from Comparative Example 1 to Example 1, to Example 2 and to Example 3 (205 to 210 A/g-Pt), the reaction inhibitor adding treatment and the low temperature keeping treatment were carried out in combination, are about five or more times higher than the increase in the platinum mass activity from Comparative Example 1 to Comparative Example 2 and to Comparative Example 3 (40 A/g-Pt), in each of which any one of the reaction inhibitor adding treatment and the low temperature keeping treatment was carried out.

Next, the platinum mass activities of the core-shell catalyst particles (not subjected to the acid treatment) of Examples 1 to 3 and Comparative Examples 1 to 3 were compared to discuss the difference between the platinum mass activity increasing effect of the case where the reaction inhibitor adding treatment and the low temperature keeping treatment were carried out in combination (Examples 1 to 3) and the expected platinum mass activity increasing effect of the combination of the case where only the reaction inhibitor adding treatment was carried out (Comparative Example 2) and the case where only the low temperature keeping treatment was carried out (Comparative Example 3).

It is clear that the increase in the platinum mass activity from Comparative Example 1 to Example 1, to Example 2 and to Example 3 (205 to 210 A/g-Pt) are about 2.5 or more times higher than the additive effect (platinum mass activity increasing effect) expected by the combination of the reaction inhibitor adding treatment and the low temperature keeping treatment, that is, the sum (80 A/g-Pt) of the increase in the platinum mass activity from Comparative Example 1 to Comparative Example 2 (40 (=380−340) A/g-Pt) and the increase in the platinum mass activity from Comparative Example 1 to Comparative Example 3 (40 (=380−340) A/g-Pt).

[Effects Caused by the Combination of Reaction Inhibitor Adding Treatment and Low Temperature Keeping Treatment, in the Presence of Acid Treatment]

First, the platinum mass activities of the core-shell catalyst particles (subjected to the acid treatment) of Examples 1 to 3 and Comparative Examples 1 to 3 were compared to discuss the difference in the platinum mass activity increasing effect between the case where only the acid treatment was carried out (Comparative Example 1) and the case where the reaction inhibitor adding treatment, the low temperature keeping treatment and the acid treatment were carried out in combination (Examples 1 to 3), where the reaction inhibitor adding treatment and the acid treatment were carried out in combination (Comparative Example 2) and where the low temperature keeping treatment and the acid treatment were carried out in combination (Comparative Example 3).

As shown in FIG. 3, the platinum mass activities of the core-shell catalyst particles subjected to the acid treatment are as follows: 750 A/g-Pt in Example 1, 750 A/g-Pt in Example 2, 755 A/g-Pt in Example 3, 450 A/g-Pt in Comparative Example 1, 480 A/g-Pt in Comparative Example 2, and 480 A/g-Pt in Comparative Example 3.

From these results, it is clear that for the core-shell catalyst particles subjected to the acid treatment, the increase in the platinum mass activity from Comparative Example 1 to Comparative Example 2 and to Comparative Example 3 are both 30 (=480−450) A/g-Pt; meanwhile, the increase in the platinum mass activity from Comparative Example 1 to Example 1, to Example 2 and to Example 3 are as follows: 300 (=750−450) A/g-Pt in Examples 1 and 2, and 305 (=755−450) A/g-Pt in Example 3.

Therefore, it is clear that the increase in the platinum mass activity from Comparative Example 1 to Example 1, to Example 2 and to Example 3 (300 to 305 A/g-Pt) are about 10 or more times higher than the increase in the platinum mass activity from Comparative Example 1 to Comparative Example 2 and to Comparative Example 3 (30 A/g-Pt).

Next, the platinum mass activities of the core-shell catalyst particles (subjected to the acid treatment) of Examples 1 to 3 and Comparative Examples 1 to 3 were compared to discuss the difference between the platinum mass activity increasing effect of the case where the reaction inhibitor adding treatment, the low temperature keeping treatment and the acid treatment were carried out in combination (Examples 1 to 3) and the expected platinum mass activity increasing effect of the combination of the case where only the reaction inhibitor adding treatment and the acid treatment were carried out (Comparative Example 2) and the case where only the low temperature keeping treatment and the acid treatment were carried out (Comparative Example 3).

It is clear that for the core-shell catalyst particles subjected to the acid treatment, the increase in the platinum mass activity from Comparative Example 1 to Example 1, to Example 2 and to Example 3 (300 to 305 A/g-Pt) are about 5 or more times higher than the additive effect (platinum mass activity increasing effect) expected by the combination of the reaction inhibitor adding treatment and the low temperature keeping treatment on the premise of the acid treatment, that is, the sum (60 A/g-Pt) of the increase in the platinum mass activity from Comparative Example 1 to Comparative Example 2 (30 (=480−450) A/g-Pt) and the increase in the platinum mass activity from Comparative Example 1 to Comparative Example 3 (30 (=480−450) A/g-Pt).

[Effects of Acid Treatment]

The platinum mass activities of the core-shell catalyst particles (before subjected to the acid treatment) of Examples 1 to 3 and Comparative Examples 1 to 3 were compared to the platinum mass activities of the core-shell catalyst particles (after subjected to the acid treatment) of Examples 1 to 3 and Comparative Examples 1 to 3, respectively, to discuss the difference in the effect caused by the acid treatment between the case where the reaction inhibitor adding treatment and the low temperature keeping treatment were carried out in combination (Examples 1 to 3) and the case where none of the treatments was carried out (Comparative Example 1) and where any one of the treatments was carried out (Comparative Examples 2 and 3).

For the increase in the platinum mass activity by the acid treatment, the following results are clear from the difference in the platinum mass activity between the core-shell catalyst particles (not subjected to the acid treatment) of Comparative Examples 1 to 3 and Examples 1 to 3 and the core-shell catalyst particles (subjected to the acid treatment) of Comparative Examples 1 to 3 and Examples 1 to 3, respectively: 110 (=450−340) A/g-Pt in Comparative Example 1, 100 (=480−380) A/g-Pt in Comparative Examples 2 and 3, 200 (=750−550) A/g-Pt in Example 1, 205 (=750−545) A/g-Pt in Example 2, and 205 (=755−550) A/g-Pt in Example 3.

Therefore, it is clear that the platinum mass activity increasing effect Examples 1 to 3 obtained is about two times higher than Comparative Examples 1 to 3. Therefore, it can be said that a much higher effect than the expected platinum mass activity increasing effect (100 A/g-Pt) was obtained by the acid treatment.

[Effects Caused by the Combination of Reaction Inhibitor Adding treatment, Low Temperature Keeping Treatment and Acid Treatment]

From a comparison between the platinum mass activity of the core-shell catalyst particles (not subjected to the acid treatment) of Comparative Example 1 and the platinum mass activity of the core-shell catalyst particles (subjected to the acid treatment) of Example 1, of Example 2 and of Example 3, a comparison between the platinum mass activity of the core-shell catalyst particles (not subjected to the acid treatment) of Comparative Example 1 and the platinum mass activity of the core-shell catalyst particles (not subjected to the acid treatment) of Comparative Example 2 and of Comparative Example 3, and a comparison between the platinum mass activity of the core-shell catalyst particles (not subjected to the acid treatment) of Comparative Example 1 and the platinum mass activity of the core-shell catalyst particles (subjected to the acid treatment) of Comparative Example 1, the difference between the platinum mass activity increasing effect of the case where the reaction inhibitor adding treatment, the low temperature keeping treatment and the acid treatment were carried out in combination (Examples 1 to 3) and the expected platinum mass activity increasing effect of the combination of the case where only the reaction inhibitor adding treatment was carried out (Comparative Example 2), the case where only the low temperature keeping treatment was carried out (Comparative Example 3) and the case where only the acid treatment was carried out (Comparative Example 1), was discussed.

As shown in FIG. 3, for the increase in the platinum mass activity from the core-shell catalyst particles (not subjected to the acid treatment) of Comparative Example 1 to the core-shell catalyst particles (subjected to the acid treatment) of Example, 1 of Example 2 and of Example 3, the following results are clear: 410 (=750−340) A/g-Pt in Examples 1 and 2, and 415 (=755−340) A/g-Pt in Example 3. Meanwhile, it is clear that the increase in the platinum mass activity from the core-shell catalyst particles (not subjected to the acid treatment) of Comparative Example 1 to the core-shell catalyst particles (not subjected to the acid treatment) of Comparative Example 2 and of Comparative Example 3, are all 40 (=380−340) A/g-Pt.

Therefore, it is clear that the increase in the platinum mass activity from the core-shell catalyst particles (not subjected to the acid treatment) of Comparative Example 1 to the core-shell catalyst particles (subjected to the acid treatment) of Example 1, of Example 2 and of Example 3 (410 to 415 A/g-Pt), in each of which the reaction inhibitor adding treatment, the low temperature keeping treatment and the acid treatment were carried out in combination, are about 2.2 times higher than the additive effect (platinum mass activity increasing effect) expected by the combination of the reaction inhibitor adding treatment, the low temperature keeping treatment and the acid treatment, that is, the sum (190 A/g-Pt) of the increase in the platinum mass activity from the core-shell catalyst particles (not subjected to the acid treatment) of Comparative Example 1 to the core-shell catalyst particles (not subjected to the acid treatment) of Comparative Example 2 (40 (=380−340) A/g-Pt), the increase in the platinum mass activity from the core-shell catalyst particles (not subjected to the acid treatment) of Comparative Example 1 to the core-shell catalyst particles (not subjected to the acid treatment) of Comparative Example 3 (40 (=380−340) A/g-Pt) and the increase in the platinum mass activity from the core-shell catalyst particles (not subjected to the acid treatment) of Comparative Example 1 to the core-shell catalyst particles (subjected to the acid treatment) of Comparative Example 1 (110 (=450−340) A/g-Pt).

REFERENCE SIGNS LIST

1. Shell defective site
2. Platinum-containing shell
3. Palladium-containing core
4. Core-shell catalyst particle produced by a conventional production method
5. Core-shell catalyst particle produced by the production method of the present invention

The invention claimed is:

1. A method for producing core-shell catalyst particles comprising a core containing palladium and a shell containing platinum and covering the core,
   wherein the method comprises:
   a step of depositing copper on the surface of the palladium-containing particles by applying a potential that is nobler than the oxidation-reduction potential of copper to the palladium-containing particles in a copper ion-containing electrolyte, and
   a step of forming the shell by, inside a reaction system kept at 5° C. or more and 8° C. or less, substituting the copper deposited on the surface of the palladium-containing particles with platinum by bringing the copper into contact with a platinum ion-containing solution in which platinum ions and a reaction inhibitor that inhibits a substitution reaction between the copper and the platinum, are contained,
   and
   wherein the reaction inhibitor is at least one selected from the group consisting of citric acid, sodium salts of citric acid, potassium salts of citric acid, ethylenediaminetetraacetic acid (EDTA), sodium salts of EDTA and potassium salts of EDTA.

2. The method for producing the core-shell particles according to claim 1, wherein the method comprises a step of bringing an acid solution into contact with the palladium-containing particles subjected to the substitution of the copper with the platinum, after the substitution step.

3. The method for producing the core-shell particles according to claim 2, wherein the acid solution contains at least one selected from the group consisting of sulfuric acid, perchloric acid, nitric acid, hydrochloric acid and hypochlorous acid.

4. The method for producing the core-shell particles according to claim 1, wherein the palladium-containing particles are supported on a support.

5. The method for producing the core-shell particles according to claim 1, wherein the method further comprises a step of bubbling an inert gas into the copper ion-containing electrolyte to remove oxygen from the electrolyte prior to the step of depositing copper on the surface of the palladium-containing particles.

6. The method for producing the core-shell particles according to claim 5, wherein the inert gas is nitrogen gas.

7. A method for producing core-shell catalyst particles comprising a core containing palladium and a shell containing platinum and covering the core, wherein the method comprises:
- a step of depositing copper on the surface of the palladium-containing particles by applying a potential that is nobler than the oxidation-reduction potential of copper to the palladium-containing particles in a copper ion-containing electrolyte, and
- a step of forming the shell by, inside a reaction system kept at −3° C. or more and 9° C. or less, substituting the copper deposited on the surface of the palladium-containing particles with platinum by bringing the copper into contact with a platinum ion-containing solution in which platinum ions and a reaction inhibitor that inhibits a substitution reaction between the copper and the platinum, are contained, and
- a step of bubbling an inert gas into the copper ion-containing electrolyte to remove oxygen from the electrolyte prior to the step of depositing copper on the surface of the palladium-containing particles, and wherein the reaction inhibitor is at least one selected from the group consisting of citric acid, sodium salts of citric acid, potassium salts of citric acid, ethylenediaminetetraacetic acid (EDTA), sodium salts of EDTA and potassium salts of EDTA.

8. The method for producing the core-shell particles according to claim 7, wherein the inert gas is nitrogen gas.

* * * * *